Figure 1:
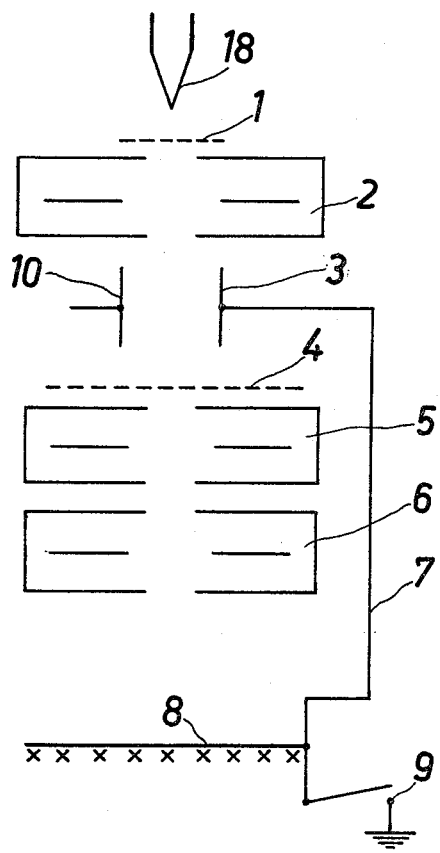

Inventors 3,134,899
INTENSITY MEASURING AND/OR RECORDING DEVICES FOR CORPUSCULAR RADIATION APPARATUS, PARTICULARLY ELECTRON MICROSCOPES
Ernst Guyenot and Eberhard Hahn, Jena, Germany, assignors to VEB Carl Zeiss Jena, Jena, Germany
Filed Nov. 13, 1961, Ser. No. 154,385
6 Claims. (Cl. 250—49.5)

This invention relates to a device which measures and indicates the current density of the final projection screen of corpuscular radiation apparatus, such apparatus being more particularly but not exclusively electron microscopes. The device is also suitable for use as an exposure meter.

In electron microscopy the times of exposure are usually between 1 and 5 seconds, according to the photo sensitive material used, and these times are often determined by subjective brightess sensation. Evidently, the estimation of the correct quantity of electrons for normal blackening can thus be too small or too excessive. Attempts have been made to overcome this inconvenience by means of devices which objectively indicate the image brightness and, accordingly, the respective exposure time. One known device is so constructed that the luminous density of a small glow lamp, shielded by green filters, can by current regulation be adjusted to correspond to that of the luminous screen. Such a device has however the disadvantage that, again, a subjective sensation is introduced and that the adjustment is dependent on the density of the light flux which emanates from the luminous screen and this in its turn depends in a complicated and continuously changing manner on the incident primary radiation.

Other known devices measure the very small beam intensities by means of electronic amplifiers (such as secondary electron multipliers), but they are costly and complicated and are not therefore economically suitable in exposure measurement.

Those disadvantages can possibly be avoided by providing in an electron microscope, below the final projective lens, a deflecting system receiving voltage from a luminous screen disposed in an electrically insulated mount and charged through the influence of the electron radiation, in consequence whereof the image is subject to an increasing deviation, the velocity of which is a measure of the intensity of the incident radiation. This device, however, includes the disadvantage of a deviation velocity which is very small for electron intensities powerful enough for the normal blackening of the photo sensitive material. Measuring this velocity requires an inconveniently long time period. Moreover, an observable image deviation depends on relatively high voltages, which means that the desired proportionality of deviation and quantity of oncoming current is no longer maintained. A further disadvantage is that current measurement in a definite object area is excluded by current variations on the target which are due to the drift of the image.

The idea underlying our invention is to indicate the beam intensity on the final projection screen by the aid of the electron-optical elements naturally existent is an electron microscope.

To this end, and according to a first aspect of the present invention, the beam deflection corresponding to the charge of the target is increased in the corpuscular radiation apparatus either by part of or by the entire lens system, and an adjustable compensation circuit is made to produce an equal but oppositely directed effect, the arrangement being such that the criterion of the intensity measurement resides in the compensation-circuit adjustment required for maintaining the image position on the final projection screen unchanged.

For beam and image deflection use can be made of part of the stigmator electrodes which are used in the known manner to correct axial astigmatism and which are electrically connected to the electrically insulated luminous screen or another suitable target electrode. To another part of the stigmator electrodes can be applied such a voltage changeable and controllable with respect to time that the effect of the first-mentioned electrode system is just compensated. Instead of the stigmator electrodes it is of course possible to use or introduce any other suitable deflecting system working on the electrostatic principle. A further aspect of the present invention incorporates means for producing momentary interruption of the deflection by earthing the deflecting means, so that the resultant sudden return of the image to its original position can be used for verifying the correct adjustment of the compensation circuit. It is of advantage to ensure that the earthing of the respective deflecting elements can be effected periodically and automatically, perhaps at an adjustable frequency. Thus, the image deviation is periodically interrupted and the initial state periodically recovered, which at a sufficiently small period guarantees linearity of the deflection process and also permits to increase the adjustment sensitivity by observation of the deflection process at the point of discontinuity of the sweep voltage.

The device according to the invention offers a number of further advantages. First, the incorporation of the highly magnifying lens system provides a high degree of sensitivity, which is necessary for the very slight radiation intensities in great magnifications. Second, the criterion of the adjustment of the regulating means is the immobility of the image, which is extremely convenient. Third, recording can be effected by the adjustment of a control element in a comparatively low-resistance compensation circuit separate from the high resistance measuring circuit, so that it is feasible to control automatically the time of exposure for instance by a magnetic or an electric shutter. Fourth, the indication is wholly independent of the used magnification power and to a great extent independent of the used radiation voltage.

Figure 2:
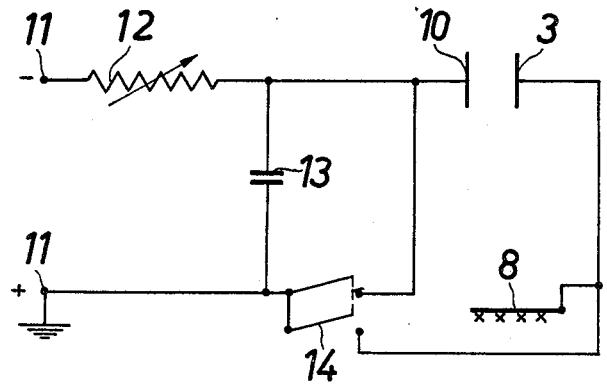
Figure 3:
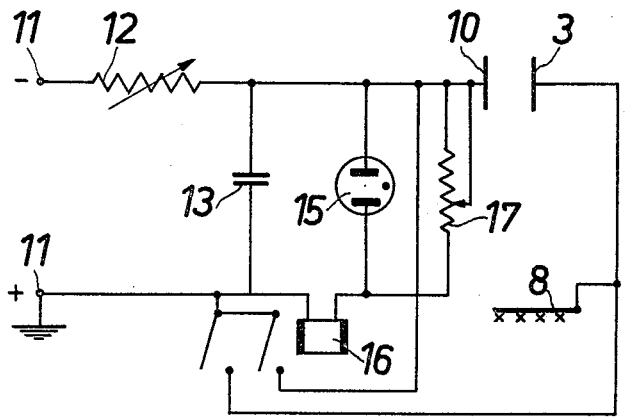

In the accompanying drawings, which illustrate schematically an embodiment of our invention, FIG. 1 shows our device in an electron-optical lens system, and FIGS. 2 and 3 show circuit diagrams of the additionally required electrical arrangement.

In FIG. 1, a beam of electrons emanating from a source 18 and passing through an objective 2 produces of an object in the image plane 1 a magnified image in an intermediate image plane 4. A multi-lens projection system 5, 6 reproduces the said image on a highly enlarged scale on a final projection screen 8. This screen 8 is connected to but electrically insulated from a bushing (not shown) by means of which it can be tilted out of the ray path in the known manner, so as to expose a photographic plate (not shown) located beneath the screen. A switch 9, preferably in mechanical connection with the luminous-screen drive, causes the screen 8 to be earthed as desired. The luminous screen 8 is also connected by a cable 7, preferably inside the apparatus, to a deflecting electrode 3 which is disposed below the objective and which preferably constitutes part of the stigmator electrodes which correct axial astigmatism in the known manner. A deflecting electrode 10 opposite electrode 3 is connected, over an electrically insulated and vacuum-tight bushing in the wall of the housing (not shown) of electron microscope, to the sweep-voltage terminal of the electrical arrangement shown in FIGS. 2 and 3.

The circuit arrangement illustrated in FIGS. 2 and 3 is used to supply to the electrode 10 the voltage necessary to compensate the deflection. When a switch 14 is opened, the luminous screen 8 is charged with electrons at a velocity which is proportional to the incident electron radiation and which is constant at the initial state when the measuring circuit has with respect to the earth a sufficiently high insulation resistance of for instance 10 ohms. Said velocity is given by the equation $$\frac{dU}{dt}=\frac{F \cdot J}{C}$$

F being the target surface area of the luminous screen, J the incident intensity and C the capacity of the measuring circuit as compared to earth. On the other hand, a condenser 13 of a capacity C' is charged over a series resistance 12 with a voltage V(t) whose change with respect to time in the initial state of the charge is given by the equation $$\frac{dV}{dt}=\frac{V_0}{C' \cdot R}$$

in which $V_0$ is the voltage applied to terminals 11. By adjusting the series resistance 12 accordingly to $$R=\frac{C}{C'} \cdot \frac{V_0}{F \cdot J}$$

it is possible to obtain $$\frac{dU}{dt}=\frac{dV}{dt}$$

which means that the deflection process is interrupted. To maintain the linearity of the dependence of the voltages U and V during that period, the switch 14 must be closed after a short time, for example four seconds, in consequence of which the original image position is restored. This process can be repeated several times until complete compensation has been obtained by a corresponding adjustment of the series resistance 12.

As shown in FIG. 3, the discharge necessary at short time intervals can be effected automatically by means of a glow lamp 15 and a relay 16. It is convenient in this case to adjust the magnitude $$\frac{dU}{dt}$$

by means of a potentiometer 17 and to provide that the sweep frequency at the series resistance 12 is additionally adjustable.

We claim:

1. An electron microscope having a source of electrons, an electron-optical lens system consisting of an objective lens and at least a projection lens, a projection screen and means for directing a beam of electrons from said source to an object and through said lens system, said beam producing a magnified image of said object on said projection screen, a first deflecting electrode being disposed in the direction of said beam behind said objective lens and electrically connected to said projection screen to deflect said beam corresponding to the charge of said projection screen, a second deflecting electrode being connected to an adjustable compensating circuit and working against the deflection of said beam by said first deflecting electrode, the adjustment of said compensating circuit by which the deflection of said beam by said first deflecting electrode is cancelled being a measure of the image brightness on said projection screen.

2. An electron microscope having a source of electrons, an electron-optical lens system consisting of an objective lens and at least a projection lens, a system of stigmator electrodes for correcting the axial astigmatism of said lens system, a projection screen and means for directing a beam of electrons from said source to an object and through said lens system, said beam producing a magnified image of said object on said projection screen, a part of said stigmator electrodes being electrically connected to said projection screen to deflect said beam corresponding to the charge of said projection screen, a second part of said stigmator electrodes being connected to an adjustable compensating circuit and working against the deflection of said beam by said first part, the adjustment of said compensating circuit by which the deflection of said beam by said first part is cancelled being a measure of the image brightness on said projection screen.

3. An electron microscope having a source of electrons, an electron-optical lens system consisting of an objective lens and at least a projection lens, a projection screen and means for directing a beam of electrons from said source to an object and through said lens system, said beam producing a magnified image of said object on said projection screen, a first deflecting electrode being disposed in the direction of said beam behind said objective lens and electrically connected to said projection screen to deflect said beam corresponding to the charge of said projection screen, a second deflecting electrode being connected to an adjustable compensating circuit and working against the deflection of said beam by said first deflecting electrode, the adjustment of said compensating circuit by which the deflection of said beam by said first deflecting electrode is cancelled being a measure of the image brightness on said projection screen, and switching means by which said deflecting electrodes can be connected to earth for a short time.

4. An electron microscope having a source of electrons, an electron-optical lens system consisting of an objective lens and at least a projection lens, a projection screen and means for directing a beam of electrons from said source to an object and through said lens system, said beam producing a magnified image of said object on said projection screen, a first deflecting electrode being disposed in the direction of said beam behind said objective lens and electrically connected to said projection screen to deflect said beam corresponding to the charge of said projection screen, a second deflecting electrode being connected to an adjustable compensating circuit and working against the deflection of said beam by said first deflecting electrode, the adjustment of said compensating circuit by which the deflection of said beam by said first deflecting electrode is cancelled being a measure of the image brightness on said projection screen, and means for periodically and automatically operating a switch by which said deflecting electrodes are connected to earth for a short time.

5. An electron microscope having a source of electrons, an electron-optical lens system consisting of an objective lens and at least a projection lens, a projection screen and means for directing a beam of electrons from said source to an object and through said lens system, said beam producing a magnified image of said object on said projection screen, a first deflecting electrode being disposed in the direction of said beam behind said objective lens and electrically connected to said projection screen to deflect said beam corresponding to the charge of said projection screen, a second deflecting electrode being connected to an adjustable compensating circuit and working against the deflection of said beam by said first deflecting electrode, the adjustment of said compensating circuit by which the deflection of said beam by said first deflecting electrode is cancelled being a measure of the image brightness on said projection screen, said compensating circuit comprising an adjustable resistance by which the voltage increase with respect to time at said second deflecting electrode can be varied.

6. An electron microscope having a source of electrons, an electron-optical lens system consisting of an objective lens and at least a projection lens, a projection screen and means for directing a beam of electrons from said source to an object and through said lens system, said beam producing a magnified image of said object on said projection screen, a first deflecting electrode being disposed in the direction of said beam behind said objective lens and electrically connected to said projection screen to deflect said beam corresponding to the charge of said projection screen, a second deflecting electrode being connected to an adjustable compensating circuit and working against the deflection of said beam by said first deflecting electrode, the adjustment of said compensating circuit by which the deflection of said beam by said first deflecting electrode is cancelled being a measure of the image brightness on said projection screen, and a device for automatically controlling the exposure of photosensitive material which can be inserted in the beam instead of said projection screen, said device being so coupled with said compensating circuit that the time of exposure of said photosensitive material is automatically controlled by the adjustment of said compensating circuit.

References Cited in the file of this patent
UNITED STATES PATENTS

| | | |
|---|---|---|
| 2,879,394 | Dahle et al. | Mar. 24, 1959 |
| 2,991,361 | Herrmann | July 4, 1961 |